(12) United States Patent
Berto et al.

(10) Patent No.: US 9,696,236 B1
(45) Date of Patent: Jul. 4, 2017

(54) TESTING DEVICE INCLUDING PEDESTAL, VIBRATORY PLATFORM AND LOCKING MECHANISM FOR CLAMPING THE PEDESTAL TO THE PLATFORM, AND TEST EQUIPMENT COMPRISING THE SAME

(71) Applicant: Keysight Technologies, Inc., Minneapolis, MN (US)

(72) Inventors: Thomas E. Berto, Santa Rosa, CA (US); David Henderson, Santa Rosa, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 281 days.

(21) Appl. No.: 14/539,945

(22) Filed: Nov. 12, 2014

(51) Int. Cl.
*G01M 7/04* (2006.01)
*G01M 7/02* (2006.01)

(52) U.S. Cl.
CPC .................... *G01M 7/027* (2013.01)

(58) Field of Classification Search
CPC ........... G01M 7/027; G01M 7/00; G01M 7/02
USPC .................................... 73/663, 662
See application file for complete search history.

(56) References Cited

U.S. PATENT DOCUMENTS

| | | | | |
|---|---|---|---|---|
| 3,242,724 | A * | 3/1966 | Ceparano | G01M 7/04 384/99 |
| 5,435,533 | A * | 7/1995 | Weinmann, Jr. | B25B 5/12 269/228 |
| 2007/0062293 | A1* | 3/2007 | Lund | G01M 7/04 73/663 |
| 2008/0034876 | A1* | 2/2008 | Crowson, II | G01M 7/04 73/668 |
| 2015/0096383 | A1* | 4/2015 | Crowson, II | G01M 7/04 73/668 |

* cited by examiner

*Primary Examiner* — Laura Martin
*Assistant Examiner* — Rose M Miller

(57) ABSTRACT

A test apparatus includes a vibratory body that shakes a device under testing (DUT), a pedestal dedicated to support the DUT and disposed on the vibratory body, and a clamping mechanism operative to selectively clamp the pedestal to the vibratory body and release the pedestal from the vibratory body. The vibratory body and the pedestal define a cavity in which the clamping mechanism is disposed. The clamping mechanism includes a clamp ring and at least one locking element carried by the clamp ring so as to be displaceable in a radial direction relative to the clamp ring, at least one tang facing the at least one locking element in the radial direction, and a piston slidable in an axial direction relative to the clamp ring between a first position at which the pedestal is free from vibratory body and a second position at which the locking element is compressed between the piston and the tang.

19 Claims, 6 Drawing Sheets

TESTING DEVICE INCLUDING PEDESTAL, VIBRATORY PLATFORM AND LOCKING MECHANISM FOR CLAMPING THE PEDESTAL TO THE PLATFORM, AND TEST EQUIPMENT COMPRISING THE SAME

BACKGROUND

During the development and course of manufacturing electronic components (i.e., electronic circuits, devices and the like), it is often necessary to test the components to confirm their reliability, durability and/or integrity. According to one aspect of such testing, the electrical performance of a component is tested while the component is subjected to vibrations or mechanical shock (referred to hereinafter as being "shaken").

There are different types of test devices used for this purpose each including a platform that is to be vibrated, a support to which the electronic component is mounted, and a clamping mechanism for locking the support to the platform.

The locking mechanism may comprise bolts by which the support and the platform can be manually or automatically connected, a peripheral actuator (hydraulic, screw-actuated, pneumatic or solenoid-platformd) by which the support and platform are clamped together at and along the outer periphery of the support, a magnetic actuator of electromagnets co-acting with feromagnetic material of the support, or a pnematic system by which a vacuum is created between the support and the platform such that atmospheric pressure (i.e., the pressure of the ambient) serves to clamp the support and the platform together. However, these locking mechanisms have various drawbacks and disadvantages.

SUMMARY

According to one aspect of the inventive concept, there is provided a testing device comprising a platform by which a device under testing (DUT) is to be shaken during testing, and a DUT mount dedicated to support the DUT, and in which the platform has an upper portion including a mount surface and defining a first recess of the testing device, at least one locking element facing an upper portion of the first recess and displaceable in a radial direction of the platform, and a piston disposed in the first recess, in which the piston has an outer peripheral clamping surface and is slidable within the first recess in an axial direction, corresponding to a longitudinal axis of the testing device, between a first position at which the locking element is located at a non-clamping position and a second position at which the clamping surface holds the locking element at a clamping position radially outward of the non-clamping position, in which the DUT mount has a lower surface in which a second recess of the testing device is defined, and in which the DUT mount includes at least one tang delimiting the second recess. Each locking element faces a tang in a testing position in which the DUT mount is disposed on the platform with the lower surface of the DUT mount facing the mount surface of the platform.

According to another aspect of the inventive concept, there is provided a test apparatus comprising a vibratory body that shakes a device under testing (DUT), a pedestal dedicated to support the DUT and disposed on the vibratory body, and a clamping mechanism operative to selectively clamp the pedestal to the vibratory body and release the pedestal from the vibratory body and in which the vibratory body and the pedestal define a cavity therein. The clamping mechanism is disposed in the cavity, and the clamping mechanism includes a clamp ring and at least one locking element carried by the clamp ring so as to be displaceable in a radial direction relative to the clamp ring, at least one tang facing the at least one locking element in the radial direction, and a piston slidable in an axial direction relative to the clamp ring between a first position at which the pedestal is free from vibratory body and a second position at which the locking element(s) is/are compressed between the piston and the tang(s) such that the pedestal is clamped to the vibratory body.

According to another aspect of the inventive concept, there is provided test equipment for testing the effect of vibrations or shock on a device under testing (DUT), the equipment comprising a shaker system including a vibratory body and a shaking mechanism that shakes the vibratory body, a pedestal dedicated to support a DUT, and a locking system operative to selectively clamp the pedestal to the vibratory body and release the pedestal from the vibratory body, and in which the pedestal is positionable on the vibratory body in a test position, the pedestal and the vibratory body define a cavity therein when the pedestal is disposed on the vibratory body in the test position, and the locking system comprises a clamping mechanism disposed in the cavity when the pedestal is in the test position, and an actuator for the clamping mechanism. The clamping mechanism includes a clamp ring and at least one locking element carried by the clamp ring so as to be displaceable in a radial direction relative to the clamp ring, at least one tang facing the at least one locking element in the radial direction, and a piston. The actuator is operative to slide the piston in an axial direction relative to the clamp ring between a first position at which the pedestal is free from vibratory body and a second position at which the at least one locking element is compressed between the piston and the tang such that the pedestal is clamped to the vibratory body.

BRIEF DESCRIPTION OF THE DRAWINGS

These and other features of the inventive concept as well as advantages thereof will be better understood from the detailed description of the preferred embodiments that follows as made with reference to the accompanying drawings. In the drawings.

DETAILED DESCRIPTION OF THE PREFERRED EMBODIMENTS

Figure 1:
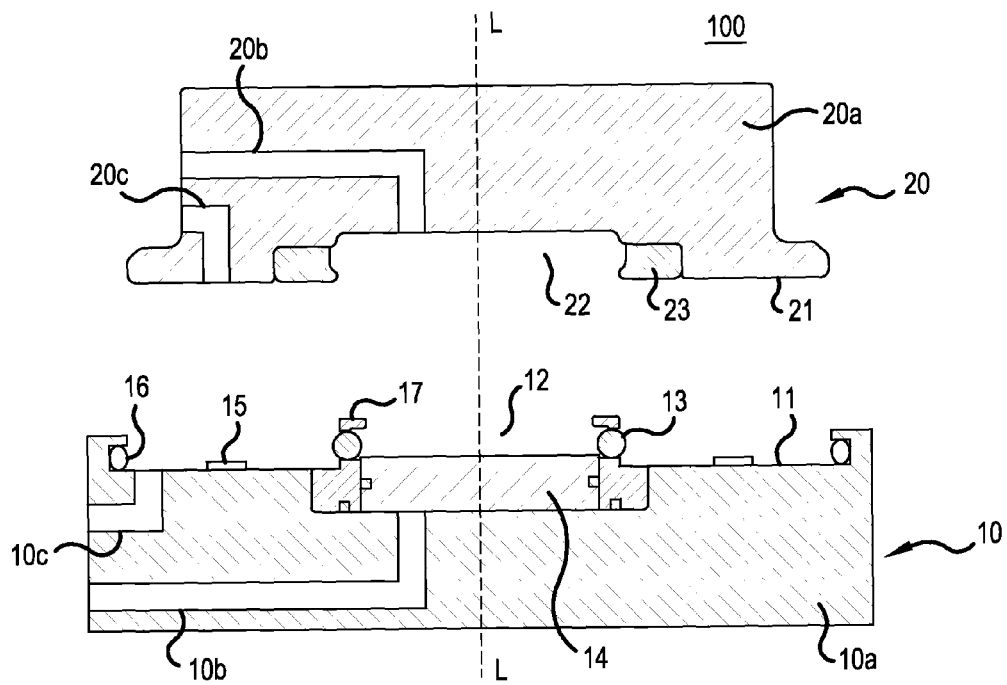
FIG. 1 is a cross-sectional view of one embodiment of a DUT testing device according to the inventive concept.

Various embodiments and examples of embodiments of the inventive concept will be described more fully hereinafter with reference to the accompanying drawings. In the drawings, the sizes and relative sizes and shapes of elements may be exaggerated for clarity. Also, like numerals are used to designate like elements throughout the drawings.

Other terminology used herein for the purpose of describing particular examples or embodiments of the inventive concept is to be taken in context. For example, the terms "comprises" or "comprising" when used in this specification specifies the presence of stated features or processes but does not preclude the presence of additional features or processes. The term "radially" may be used in a broad sense such as to describe a relationship when viewed in plan but not necessarily when viewed from the side, i.e., may describe a direction that is perpendicular to a vertical axis but inclined relative to the horizontal.

One embodiment of a DUT test device according to the inventive concept will now be described in detail with reference to FIGS. 1-6.

Referring first to FIG. 1, the test device 100 comprises a platform 10 and a DUT mount 20. The DUT mount 20 includes a pedestal 20a configured to support a device under testing (DUT) in the apparatus. The device may be an electronic component such as an integrated circuit (IC), a chip, a semiconductor device package, or the like. The platform 10 includes a vibratory body 10a operative to impart vibrations or mechanical shock, i.e., shake, the DUT when the DUT mount 20 is positioned on and clamped to the platform 10 (described in more detail below with reference to FIGS. 7 and 8).

An upper portion of the platform 10 defines a first recess 12 of the testing device and includes a mount surface 11 extending around the first recess 12. The platform 10 also has a clamp ring 17 fixed to the upper portion of the vibratory body 10a, one or more locking elements 13 carried by the clamp ring 17 so as to face an upper portion of the first recess 12, and a piston 14 disposed in the first recess 12. A lower portion of the DUT mount 20 defines a second recess 22 of the testing device 100, and includes a lower surface 21 extending around the second recess 22. The DUT mount 20 also has one or more tangs 23 integral with the pedestal 20a. Each locking element 13 faces a tang 23 in a testing position (FIGS. 7 and 8) in which the DUT mount 20 is disposed on the platform 10 with the lower surface 21 of the DUT mount adjacent the mount surface 11 of the platform 10. Also, each locking element 13 is supported by the clamp ring 17 so as to displaceable in a radial direction of the platform 10.

Figure 2:
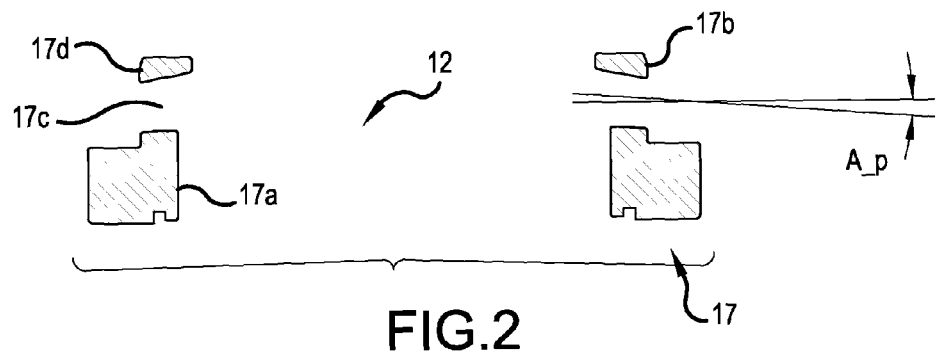
FIG. 2 is a cross-sectional view of one example of a clamp ring of the DUT testing device.
Figure 3:
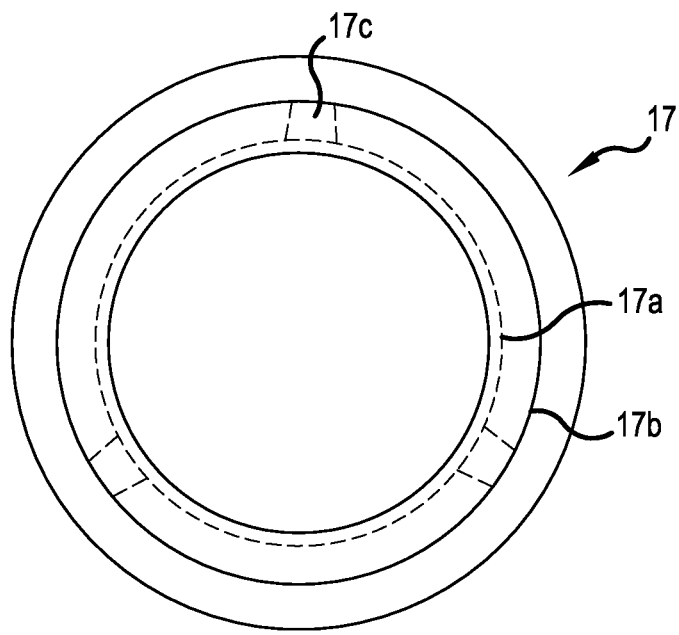
FIG. 3 is a plan view of the clamp ring.

Referring to FIGS. 1-3, in this embodiment, the clamp ring 17 has an inner peripheral surface 17a, an outer peripheral surface 17b, and at least one tubular passage 17c extending between and open at the inner and outer peripheral surfaces 17a, 17b. The inner peripheral surface 17a of the clamp ring 17 delimits the first recess 12 of the test device 100 along with a central upper surface of the vibratory body 10a. The piston 14 is fitted to the inner peripheral surface 17a of the clamp ring 17 so as to be slidable within the first recess 12 in an axial direction corresponding to a longitudinal axis L of the test device 100. In this respect, the piston 14 is coaxial with the clamp ring 17. Also, in this embodiment, each locking element 13 is a rolling or sliding element that is disposed in a respective tubular passage 17c.

The cross section of the tubular passage 17c is sized and shaped such that the rolling or sliding element is free to roll and/or slide in the passage in a radial direction of the platform 10 that is substantially perpendicular to the axial direction. For example, as shown in FIG. 1, each tubular passage 17c has a circular cross section, and each locking element 13 is a ball that is free to roll and/or slide in a tubular passage 17c.

Alternatively, each locking element 13 may be a cylindrical or other non-spherical roller. In this case, a relatively greater area of contact is provided between the locking element 13 and the piston 14 and tang 23, thereby minimizing contact stress.

In another example, each locking element 13 is a block that slides within tubular passage 17c but whose shape prevents it from rolling. A spring could attach each block-like locking element 13 to the clamp ring so as to bias the locking element radially inwardly and into the tubular passage 17c so as to be out of the way of the associated tang 23 when the DUT mount 20 is disposed on the platform 10 in the first (ie, non-clamped) position.

The tubular passages 17c (and thus, the locking elements received therein) may be spaced equidistantly from and at uniform angles about the central longitudinal axis of the clamp ring 17 (corresponding to axis L in FIG. 1). Furthermore, each tubular passage 17c may be sized to accommodate more than one free-rolling or sliding locking element 13.

However, the tubular passages 17c and locking elements 13 do not have to be spaced uniformly with respect to the central longitudinal axis of the clamp ring 17 but can be spaced at different angles about the central longitudinal axis and/or may be spaced at different (radial) distances from the central longitudinal axis. The same may thus be true for corresponding ones of the tangs 23 with respect to a central longitudinal axis of the DUT mount 20.

In addition, as best shown in FIG. 2, the clamp ring 17 has a stop 17d at the radially outer end each tubular passage 17c to prevent the locking element 13 from rolling or sliding out of the tubular passage 17c while still allowing for a portion of the locking element 13 to protrude outwardly from the tubular passage 17c. Thus, each tubular passage 17c has a radially outer end portion having a dimension less than that of the locking element 13 disposed in the passage. Moreover, each tubular passage 17c may be inclined between the inner peripheral surface 17a of the clamp ring 17 and tubular passage 17c, meaning that the longitudinal axis of each tubular passage 17c subtends an angle A_p with a plane perpendicular to the central longitudinal axis of the clamp ring 17. Preferably, in this respect, each tubular passage 17c has a longitudinal axis that is inclined downwardly in a direction from the inner peripheral surface 17a of the clamp ring 17 to the tubular passage 17c, as shown in FIG. 2. However, the longitudinal axis of each tubular passage could be inclined upwardly, instead, in the direction from the inner peripheral surface 17a of the clamp ring 17 to the tubular passage 17c.

Figure 4:
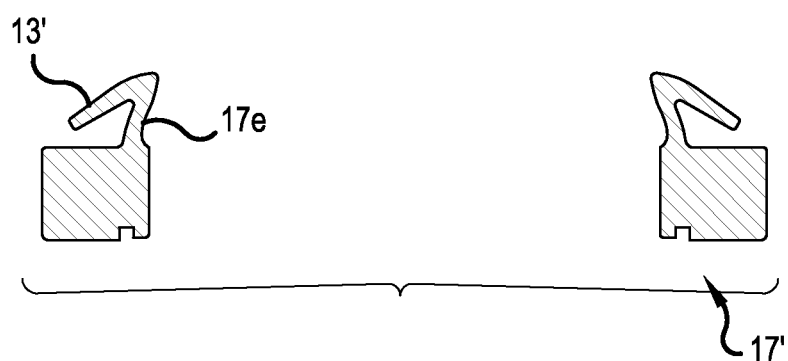
FIG. 4 a cross-sectional view of another example of a clamp ring of a DUT testing device according to the inventive concept.

FIG. 4 shows another example of a clamp ring 17'. In this example, each locking element 13' is a detent element connected to an annular body of the clamp ring 17' through a flexure 17e.

Although the testing device 100 may employ only one locking element 13 (e.g., rolling element or sliding element or detent element), any number of locking elements 13 may be provided. Preferably, three or more locking elements 13 are provided. In this regard, FIG. 3 shows an example of the clamp ring 17 having three tubular passages 17c for respectively accommodating locking elements 13 in the form of balls.

Figure 5:
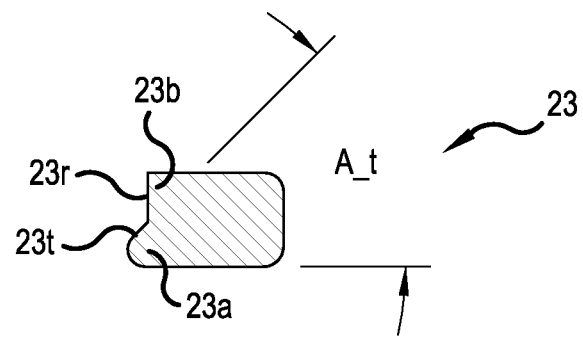
FIG. 5 is a sectional view of a tang of a DUT mount of the DUT testing device according to the inventive concept, as taken in a radial plane of the DUT mount.

Referring to FIGS. 1 and 5, the DUT mount 20 may have a single tang 23 in the form of an annular member. In this case, the annular member may be seated in a complementary groove in the lower portion of the pedestal 20a. Alternatively, the DUT mount 20 may have one or more discrete tangs 23. In this case as well, each tang 23 may be seated in a complementary pocket in the lower portion of the pedestal 20a. In any case, the tang(s) 23 is/are integral with the pedestal 20a.

Furthermore, in the illustrated embodiment, the tang 23 has a tread portion 23a and a riser portion 23b extending upwardly from the tread portion 23a. The tread and riser portions 23a, 23b present a contact surface 23t, 23r that delimits the second recess 22 of the test device 100 along with a surface or surfaces of the pedestal 20a. The contact surface 23t presented by the tread portion 23a subtends an acute angle A_t with a plane perpendicular to the axial direction of the DUT mount 20 (corresponding to the longitudinal axis L of the test device 100). The contact surface 23r presented by the riser portion 23b extends substantially parallel to the axial direction of the DUT mount 20.

Figure 6:
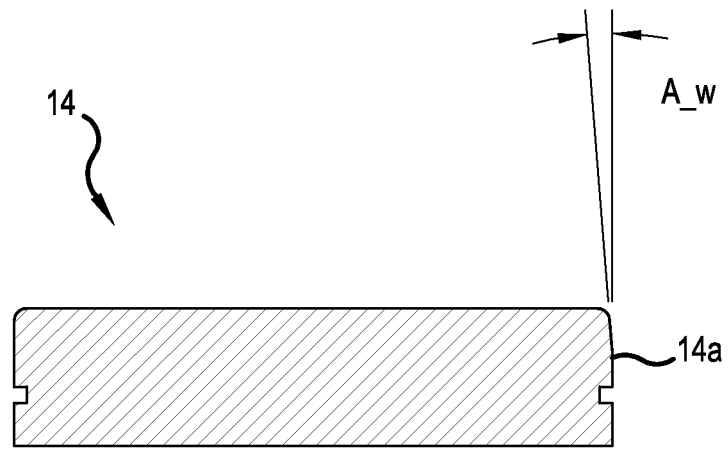
FIG. 6 is a cross-sectional view of one example of a piston of the DUT testing device.

Referring to FIGS. 1 and 6, the piston has an outer peripheral clamping surface 14a. Preferably, the piston tapers from bottom to top. For example, in the illustrated embodiment, the outer peripheral clamping surface 14a of the piston has the shape of a frustum. However, the degree of taper may vary from bottom to top instead of being uniform. Also, the outer peripheral clamping surface 14a may be constituted by the entire outer peripheral surface of the piston or by just one or more sections thereof corresponding to the locking element(s) 13.

In the illustrated example, the piston 14 has a circular horizontal profile. Alternatively, the piston 14 may have a polygonal horizontal profile such as a star-shaped horizontal profile. The locking element(s) 13 and tang(s) 23 are numbered and arranged to suit the horizontal profile of the piston 14.

In any case, in the state shown in FIG. 1, the piston 14 is slidable within first recess 12 in the axial direction of the platform 10 (corresponding to the longitudinal axis L of the testing device 100) between a first position at which each locking element 13 is located at a non-clamping position and a second position at which the outer peripheral clamping surface 14a holds the locking element 13 at a clamping position radially outwardly of the non-clamping position.

This will now be explained in more detail with respect to FIGS. 1, 5 and 7-9.

The DUT mount 20 can be positioned on the platform in a testing position (FIGS. 7 and 8) in which the mount surface 11 of the platform 10 faces the lower surface 21 of the DUT mount 20. This may be performed in test apparatus, according to the inventive concept, by disposing the DUT mount 20 over the platform 10 with the DUT mount 20 aligned with the platform 10 along the longitudinal axis L, and then bringing the DUT mount 20 and the platform 10 together by lowering the DUT mount 20 and/or raising the platform 10. A gasket or washers 15 may be disposed on the mount surface 11 so as to maintain a small amount of spacing but allow for a stiff joint between the mount surface 11 of the platform 10 and the lower surface 21 of the DUT mount 20. Also, a seal 16, such as an inflatable ring, may be provided circumjacent the mount surface 11 so as to seal the region between the mount surface 11 of the platform 10 and the lower surface 21 of the DUT mount 20 when the DUT mount is in the testing position.

Figure 7:
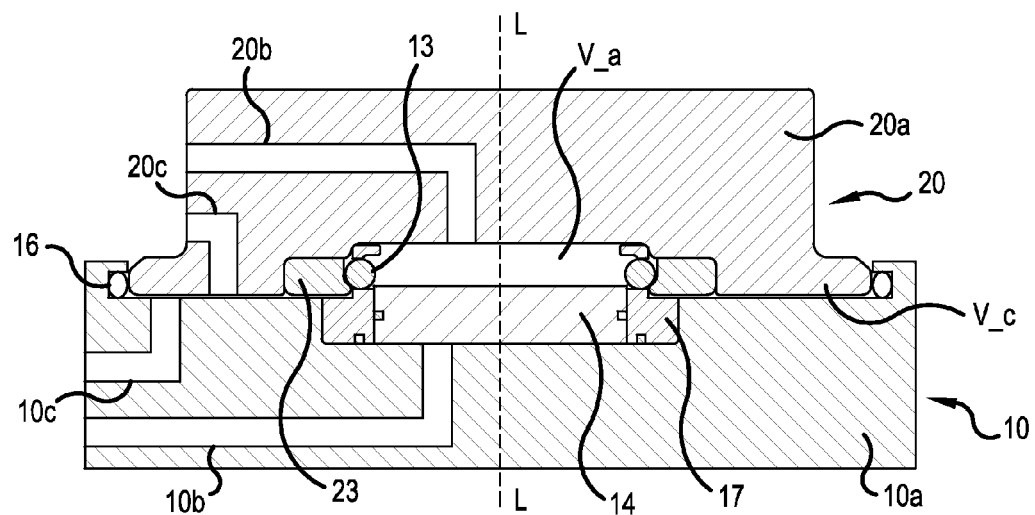
FIG. 7 is a cross-sectional view of DUT test apparatus according to the inventive concept, showing a DUT mount of the apparatus in an unclamped position.

FIG. 7 shows the piston 14 in its first position. At this time, the piston 14 is disposed at the bottom of the first recess 12 and the pedestal 20a is seated on but is free from vibratory body 10a. Furthermore, the piston 14 may engage each locking element 13 to prevent it from rolling inwardly out of the clamp ring 17.

The piston 14 is movable along the longitudinal axis L between the first position and a second position (FIG. 8) at which the locking element 13 is compressed between the piston 14 and the tang 23 such that the pedestal 20a is clamped to the vibratory body 10a. As the piston 14 is moved along the longitudinal axis L between the first position (FIG. 7) and the second position (FIG. 8), the locking element 13 rides the contact surface 23t of the tread portion 23a of the tang 23 (refer to FIGS. 5 and 9). To guide this movement, the outer peripheral clamping surface 14a of the piston 14 and the tang 23 may each have a groove (not shown) whose shape is complementary to that of part of the locking element 13 engaging the same. For example, the groove may be a semi-cylindrical surface in the case in which the locking element 13 is a ball or planar in the case in which the locking element 13 is a cylindrical roller.

In any case, when the piston 14 is in its second position, the outer peripheral clamping surface 14a of the piston 14 holds the locking element 13 in engagement with the contact surface 23t of the tread portion 23a of the tang 23. And, as described above, the tang 23 is integral with the pedestal 20a of the DUT mount 20, the locking element 13 is carried by the clamp ring 17, and the clamp ring 17 is integral with the vibratory body 10a of the platform 10. Accordingly, a vertical component of the force between the locking element 13 and the inclined contact surface 23t of the tang 23 locks the pedestal 20a and the vibratory body 10a together.

That is, in the illustrated embodiment, piston 14, clamp ring 17, locking element(s) 13, and tang(s) 23 constitute a clamping mechanism for clamping the pedestal 20a and the vibratory body 10a to one another.

Test apparatus according to the inventive concept employs an actuator for moving the piston 14 between its first and second positions. The actuator is preferably a pneumatic system (described in more detail below). To this end, the platform 10 may have an air passageway 10b extending in vibratory body 10a and open at the first recess 12, and the DUT mount 20 have an air passageway 20b extending in pedestal 20a and open at the second recess 22 (refer to FIGS. 1, 7 and 8). Pneumatic seals and fittings (such as an O-ring or the like seated in a groove in the bottom of the clamp ring 17, and a piston ring seated in a groove below the outer peripheral clamping surface 14a of the piston 14) establish an enclosed volume of space (V_a) above the piston 14 and an enclosed volume of space (V_b) below the piston 14. The enclosed volume of space (V_a) coincides with the second recess 22 and the first volume of space (V_b) coincides with the first recess 12.

The air passageways 10b, 20b allow the volume of space (V_a) to be evacuated and/or pressurized independently of the volume of space (V_b) and vice versa.

In addition, the platform 10 may have an air passageway 10c extending in vibratory body 10a and open at the mount surface 11. In addition, or alternatively, the DUT mount 20 may have an air passageway 20c extending in pedestal 20a and open at lower surface 21. In this respect, the aforementioned pneumatic seals and fittings, which may also include the seal 16, establish an enclosed volume of space (V_c)

between the mount surface 11 of the platform 10 and the mount surface 11 of the DUT mount 20. The enclosed volume of space (V_c) can be evacuated or pressurized independently of the volumes of spaces (V_a) and (V_b) through the air passageway 10c and/or 20c.

An example of using a pneumatic system to move the piston 14 between its first and second positions to operate the clamping mechanism will now be described with reference to FIGS. 7-9.

With the DUT mount 20 disposed on the platform 10 in the test position shown in FIG. 7, the space (V_a) is evacuated through air passageway 20b and the space (V_c) is evacuated through air passageway 10c and/or air passageway 20c by placing a vacuum source (e.g., vacuum pump) of the pneumatic system in fluid communication with the air passageways. Simultaneously, the pressure in space (V_b) is increased by forcing air or gas through the air passageway 10b by placing a source of compressed gas (e.g., a compressor or tank of compressed gas) of the pneumatic system in fluid communication with air passageway 10b.

As a result, a pressure differential is created across the piston 14 which forces the piston 14 upwardly towards the pedestal 20a. Again, the outer peripheral clamping surface 14a of the piston 14, in turn, forces the locking element(s) 13 radially outwardly in the tubular passage(s) 17c of the clamp ring 17. The locking element(s) 13 briefly roll or slide along the angled contact surface(s) 23t of the tang(s) 23, coming to rest in compression between the tang(s) 23, the clamp ring 17 and the outer peripheral clamping surface 14a of the piston 14 (FIGS. 8 and 9). The clamping force is the sum of the vertical components of the tang/locking element contact forces. In addition, the clamping force is augmented by the vacuums created in spaces (V_a) and (V_c) and the pressure of the ambient gas in which the testing device is located (which, for convenience, may be referred to hereinafter simply as atmospheric pressure).

To free the DUT mount 20 from the platform 10, space (V_a) is pressurized by placing a source of compressed gas of the pneumatic system in fluid communication with air passageway 20b, space (V_b) is evacuated by placing a vacuum source of the pneumatic system in fluid communication with air passageway 10b, and space (V_c) is returned to atmospheric pressure (e.g., is vented). The piston 14 is thus driven downwardly such that the locking element(s) 13 becomes free to move radially inwardly (and does so when the DUT mount 20 and the platform 10 are moved apart along the longitudinal axis L). In this method, the pressure created in space (V_a) to move the piston 14 downwardly does not have to match that created in space (V_b) to drive the piston 14 upwardly.

In alternative methods, the piston 14 is driven upwardly towards the pedestal 20a by evacuating space (V_a) without creating pressure in space (V_b) and with or without evacuating space (V_c). Likewise, the piston 14 may be driven downwardly by evacuating space (V_b) without creating pressure in space (V_a) or by creating pressure in space (V_a) without evacuating space (V_b). In these cases, the pneumatic system may include a vent for the space whose pressure is not being changed.

Note, further, although DUT testing apparatus has been described above as having air passageways that are each selectively connected to a vacuum source and a source of pressurized gas of a pneumatic system of the apparatus, each of the platform 10 and DUT mount 20 may have air passageways respectively connected to a vacuum source and a source of pressurized gas. Also, the pneumatic system may have one vacuum source (e.g., a vacuum pump) and one source of pressurized gas (e.g., a compressor) for use in common with the platform 10 and DUT mount 20 or may have a respective vacuum source and/or source of pressurized gas operatively and separately associated with each of the platform 10 and DUT mount 20.

An embodiment of test equipment according to the inventive concept will now be described in detail with reference to FIG. 10.

The test equipment includes a shaker system 200 including vibratory body 10a and a shaking mechanism 30 that shakes the vibratory body 10a, pedestal 20a dedicated and configured to support a DUT 40, and a locking system operative to selectively clamp the pedestal 20a to the vibratory body 10a and release the pedestal 20a from the vibratory body 10a. The shaking mechanism 30 may be constituted by a "shaker", many types of which are known in the art, per se, and therefore, will not be described in further detail. The vibratory body 10a may be part of the shaker or may be secured to the shaker.

Figure 8:
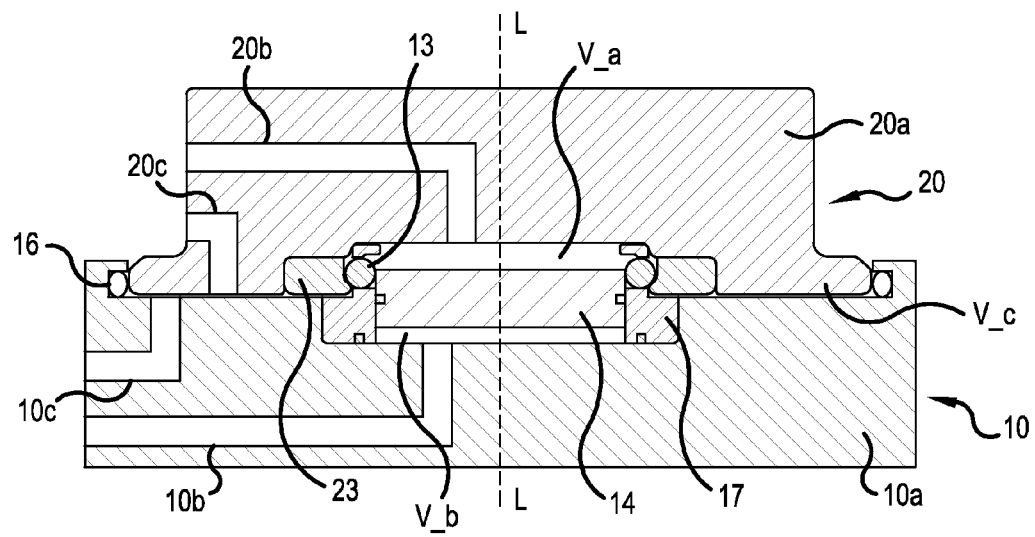
FIG. 8 is another cross-sectional view of the DUT test apparatus, but showing the DUT mount in a clamping position.
Figure 9:
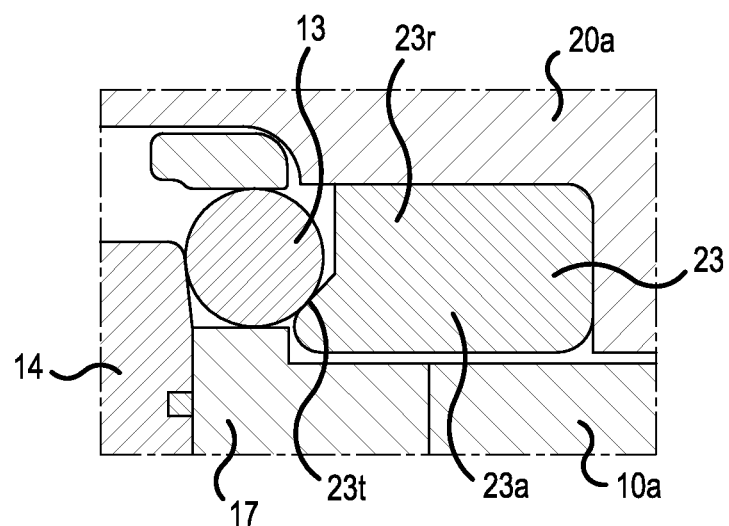
FIG. 9 is an enlarged view of portion A in FIG. 8.
Figure 10:
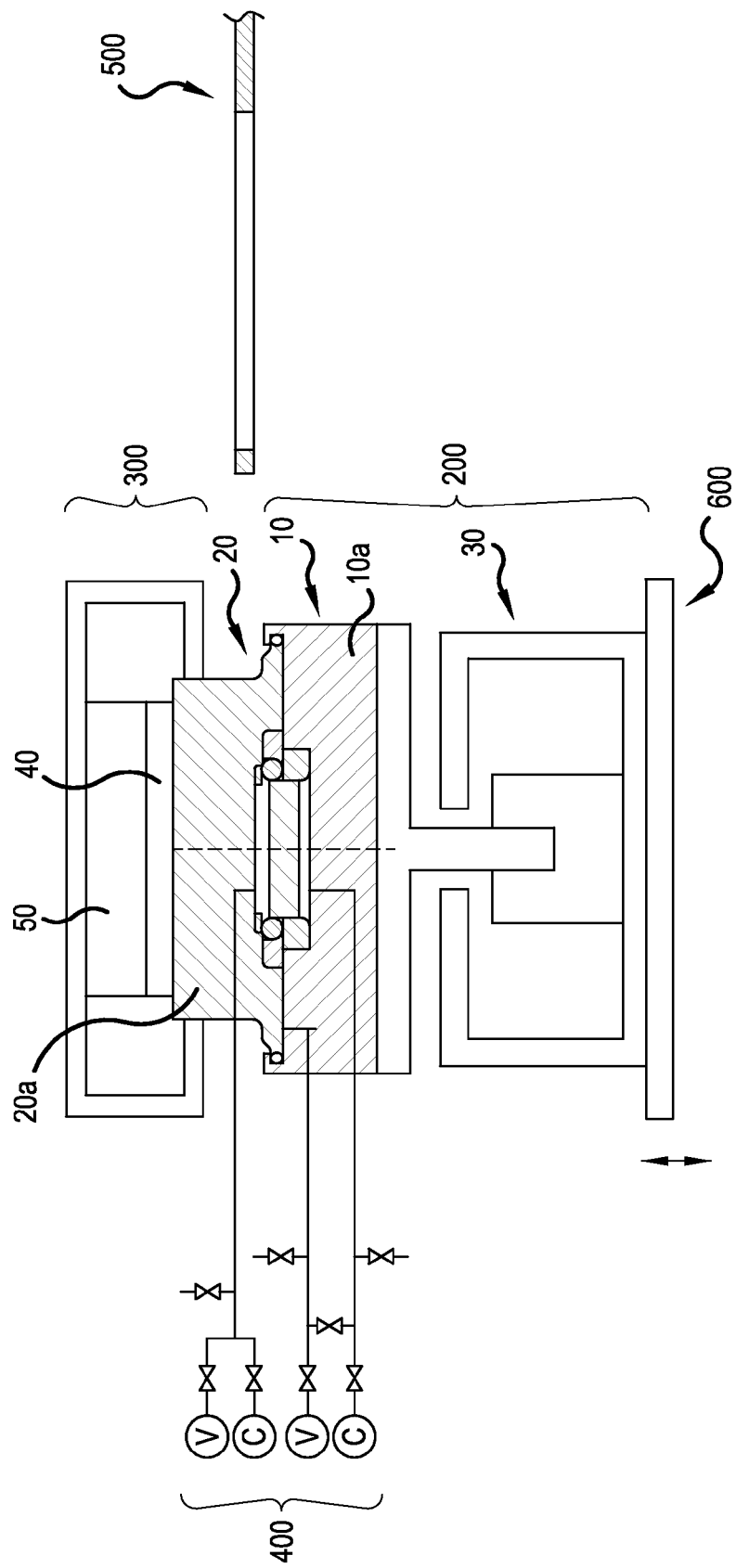
FIG. 10 is a schematic diagram of DUT test equipment according to the inventive concept.

In any case, FIG. 10 shows the pedestal 20a positioned on the vibratory body 10a in a test position and locked to the vibratory body 10a, i.e., shows an example of the DUT testing device according to the inventive concept in the position of FIGS. 8 and 9. In this position, the pedestal 20a and the vibratory body 10a define a cavity therein, a clamping mechanism is disposed in the cavity, and the clamping mechanism includes (again, refer to FIGS. 8 and 9) clamp ring 17, locking element(s) 13 carried by the clamp ring 17 so as to be displaceable in a radial direction relative to the clamp ring 17, tang(s) 23 facing the locking element(s) 13 in the radial direction, and piston 14. The clamping mechanism and examples thereof have already been described above with reference to FIGS. 1-9 and therefore, will not be described again in detail.

As was also described with reference to FIGS. 7-9, the locking system also includes an actuator operative to slide the piston 14 in an axial direction relative to the clamp ring 17 between a first position (FIG. 7) at which the pedestal 20a is free from vibratory body 10a and a second position (FIGS. 8, 9 an 10) at which the pedestal 20a is clamped to the vibratory body 10a of the shaker system 200. In this respect, the locking system may comprise a pneumatic system 400 as was described with reference to FIGS. 7 and 8. In this example, the pneumatic system 400 includes vacuum and pressurized gas sources (V) and (C), lines connecting the vacuum and pressurized gas sources (V) and (C) to the volumes of space (V_a) and (V_b) and appropriate flow controls such as shut-off valves in the lines and vents that may vent the lines to atmosphere. The pneumatic system 400 may also control the pressure in the volume of space (V_c) between the vibratory body 10a and the pedestal 20a at the region between mount surface 11 and lower surface 21 (FIG. 1).

The test equipment of this example also includes a test chamber 300 into which the pedestal 20a is inserted to thereby load DUT 40 supported by the pedestal 20a into the test chamber 300, and an electrical test device 50 connectable to the DUT when it is loaded in the test chamber 300. The electrical test device 50 is operable to test an electrical performance of the DUT. Such electrical test devices are known in the art, per se, and therefore will not be described in further detail.

The shaker system 200, DUT mount 20, and test chamber 300 may be brought to the state shown in FIG. 10 in various ways. For example, an automated system including a carrier for the DUT mount 20 (designated by reference numeral 500) may carry the DUT mount to a station at which the test chamber 300 is disposed, and insert the pedestal 20a of the DUT mount 20 into the test chamber 300 through an opening in the bottom of the test chamber 300. The shaker system 200 may be waiting at the station below the test chamber 300. Then the shaker system 200 may be raised (by an elevator 600) or controlled to raise the vibratory body 10a until the test position (FIG. 7) is realized. In addition, or alternatively, the test chamber 300 and DUT mount 20 are together lowered until the test position (FIG. 7) is realized. Then the pneumatic system 400 is operated to drive the piston 14 and clamp the pedestal 20a of the DUT mount 20 to the vibratory body 10a of the pneumatic system 400.

Conditions, such as temperature, inside the test chamber 300 are controlled. Thus, in this example of testing equipment according to the inventive concept, appropriate measures are taken ensure the creation of a seal between the pedestal 20a and the test chamber 300. The DUT 40 is electrically tested in this state by the electrical test device 50 while the DUT 40 is shaken by the shaker system 200.

As described above there is provided a DUT test device that may include a vibratory body, a pedestal and an internal locking mechanism including a clamp ring, a locking element carried by the clamp ring, a tang integral with the pedestal, and a piston that allows the locking element to selectively hold onto and release from the tang. Thus, a DUT test device according to the inventive concept may have one or more or may possess all of the following advantages.

The locking mechanism may be especially rugged because of the geometries of its components, and through appropriate selection of materials the locking mechanism can perform well under a wide range of temperatures. The DUT test device is also relatively stiff in the test position due to the fact that the pedestal may be drawn tightly against the vibratory body as, for example, facilitated by the gasket or washers. The locking mechanism may produce a very high clamping force to assure reliability when the device is shaken. The DUT test device also allows for automated operation. The DUT test device may also be expected to have a long useful life given the available tolerances and actuating pressures, etc. The DUT test device is energy efficient as relatively low amounts of power are required to operate the device and maintain the clamped state. Heat transfer between the DUT mount and the external environment, including the mount surface of the vibratory body, is minimal because of the limited contact area that may be presented by the DUT mount, the minute areas or lines of contact that may be present between the locking element(s) and the tang(s), and because the region between the mount surface of the DUT and opposing surface of the pedestal may be evacuated.

Finally, embodiments of the inventive concept and examples thereof have been described above in detail. The inventive concept may, however, be embodied in many different forms and should not be construed as being limited to the embodiments described above. Rather, these embodiments were described so that this disclosure is thorough and complete, and fully conveys the inventive concept to those skilled in the art. Thus, the true spirit and scope of the inventive concept is not limited by the embodiment and examples described above but by the following claims.

What is claimed is:

1. A testing device comprising:
    a platform by which a device under testing (DUT) is to be shaken during testing, the platform having an upper portion including a mount surface and defining a first recess of the testing device, at least one locking element facing an upper portion of the first recess and displaceable in a radial direction of the platform, and a piston disposed in the first recess,
    the piston having an outer peripheral clamping surface, and
    the piston being slidable within the first recess in an axial direction, corresponding to a longitudinal axis of the testing device, between a first position at which the at least one locking element is located at a non-clamping position and a second position at which the outer peripheral clamping surface holds the at least one locking element at a clamping position radially outwardly of the non-clamping position; and
    a DUT mount dedicated to support the DUT, the DUT mount having a lower surface in which a second recess of the testing device is defined, and the DUT mount including at least one tang delimiting the second recess, and
    wherein each of the at least one locking elements faces the at least one tang in a testing position in which the DUT mount is disposed on the platform with the lower surface of the DUT mount facing the mount surface of the platform.

2. The testing device of claim 1, wherein the platform and the DUT mount have air passageways extending therein and open at the first and second recesses, respectively.

3. The testing device of claim 2, wherein the platform has one of the air passageways, which extends therein and open at the mount surface and/or the DUT mount has one of the air passageways, which extends therein and open at the lower surface.

4. The testing device of claim 1, wherein the platform comprises a vibratory body and a locking clamp,
    the locking clamp comprises a clamp ring fixed to an upper portion of the vibratory body and having an inner peripheral surface delimiting the first recess,
    the piston is disposed in the first recess as fitted to the inner peripheral surface of the clamp ring, and
    each of the at least one locking elements is carried by the clamp ring.

5. The testing device of claim 4, wherein the clamp ring has an outer peripheral surface and at least one tubular passage extending between and open at the inner and outer peripheral surfaces, and each of the at least one locking elements is disposed in a respective the at least one tubular passage and is free to roll and/or slide in the tubular passage.

6. The testing device of claim 5, wherein the tubular passage has a radially outer end portion having a dimension less than that of the at least one locking element disposed in the at least one tubular passage, whereby the at least one locking element is prevented from rolling out of the radially outer end portion of the tubular passage.

7. The testing device of claim 6, wherein the at least one tubular passage has a longitudinal axis that is inclined upwardly or downwardly in a direction from the inner to the outer peripheral surface.

8. The testing device of claim 5, wherein the at least one tang has a tread portion that presents a contact surface which delimits the second recess, and the contact surface subtends an acute angle with a plane perpendicular to an axial direction of the DUT mount corresponding to the longitudinal axis of the testing device.

9. The testing device of claim 1, wherein the piston tapers from bottom to top.

10. The testing device of claim 1, wherein the DUT mount includes a pedestal having a bottom surface and a groove in the bottom surface, each of the at least one tangs is disposed in the groove and is fixed to the pedestal so as to be integral therewith, and each of the at least one tangs has a tread portion that presents a contact surface which delimits the second recess, the contact surface subtending an acute angle with a plane perpendicular to an axial direction of the DUT mount corresponding to the longitudinal axis of the testing device.

11. A test apparatus comprising:

a vibratory body that shakes a device under testing (DUT);

a pedestal dedicated to support the DUT and disposed on the vibratory body, and wherein the vibratory body and the pedestal define a cavity therein; and a clamping mechanism disposed in the cavity and operative to selectively clamp the pedestal to the vibratory body and release the pedestal from the vibratory body, the clamping mechanism including a clamp ring and at least one locking element carried by the clamp ring so as to be displaceable in a radial direction relative to the clamp ring, at least one tang facing the at least one locking element in the radial direction, and a piston slidable in an axial direction relative to the clamp ring between a first position at which the pedestal is free from the vibratory body and a second position at which the at least one locking element is compressed between the piston and the at least one tang such that the pedestal is clamped to the vibratory body.

12. The test apparatus of claim 11, wherein the clamp ring has inner and outer peripheral surfaces and at least one tubular passage extending between and open at the inner and outer peripheral surfaces, and each of the at least one locking elements is disposed in a respective at least one tubular passage and is free to roll in the tubular passage.

13. The test apparatus of claim 11, wherein the at least one tang has a tread portion that presents a contact surface, the contact surface subtending an acute angle with a plane perpendicular to the axial direction, whereby the at least one locking element rides the contact surface of the tread portion while the piston is moved from the first position to the second position.

14. The test apparatus of claim 11, further comprising a pneumatic system that controls a pressure differential above and below the piston.

15. The test apparatus of claim 14, wherein the vibratory body and the pedestal have upper and lower surfaces, respectively, that face each other, and the pneumatic system controls a pressure between the vibratory body and the pedestal at a region between the upper and lower surfaces.

16. Test equipment for testing the effect of vibrations or shock on a device under testing (DUT), the test equipment comprising:

a shaker system including a vibratory body and a shaking mechanism that shakes the vibratory body;

a pedestal dedicated to support a DUT, the pedestal positionable on the vibratory body in a test position, the pedestal and the vibratory body defining a cavity therein when the pedestal is disposed on the vibratory body in the test position; and a locking system operative to selectively clamp the pedestal to the vibratory body and release the pedestal from the vibratory body, the locking system comprising a clamping mechanism disposed in the cavity when the pedestal is in the test position, the clamping mechanism including a clamp ring and at least one locking element carried by the clamp ring so as to be displaceable in a radial direction relative to the clamp ring, at least one tang facing the at least one locking element in the radial direction, and a piston, and an actuator operative to slide the piston in an axial direction relative to the clamp ring between a first position at which the pedestal is free from vibratory body and a second position at which the at least one locking element is compressed between the piston and the at least one tang and the pedestal is thereby clamped to the vibratory body.

17. The test equipment as claimed in claim 16, wherein the clamp ring is disposed at an upper portion of and is integral with the vibratory body such that the clamp ring and the at least one locking element are carried by the vibratory body, the clamp ring delimiting a first recess therein, the at least one tang is disposed at a lower portion of and is integral with the pedestal, the at least one tang delimiting a second recess, and the piston is disposed in the first recess, the piston has an outer peripheral clamping surface, the first position is one at which the at least one locking element is located at a non-clamping position, and the second position is one at which the outer peripheral clamping surface of the piston holds the at least one locking element at a clamping position radially outwardly of the non-clamping position.

18. The test equipment as claimed in claim 16, wherein the actuator is a pneumatic system that controls a pressure differential above and below the piston.

19. The test equipment of claim 16, wherein the vibratory body and the pedestal have upper and lower surfaces, respectively, that face each other, and the locking system includes a pneumatic system that controls a pressure between the vibratory body and the pedestal in a volume between the upper and lower surfaces.

* * * * *